(12) United States Patent
Gao

(10) Patent No.: US 11,875,437 B2
(45) Date of Patent: Jan. 16, 2024

(54) IMAGE DRAWING METHOD BASED ON TARGET TEMPLATE IMAGE, APPARATUS, READABLE MEDIUM AND ELECTRONIC DEVICE

(71) Applicant: Beijing Bytedance Network Technology Co., Ltd., Beijing (CN)

(72) Inventor: Shiqi Gao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/816,268

(22) Filed: Jul. 29, 2022

(65) Prior Publication Data
US 2022/0375147 A1 Nov. 24, 2022

Related U.S. Application Data

(63) Continuation of application No. PCT/CN2021/076413, filed on Feb. 9, 2021.

(30) Foreign Application Priority Data

Mar. 10, 2020 (CN) .......................... 202010162713.3

(51) Int. Cl.
*G06T 11/60* (2006.01)
*G06F 3/0481* (2022.01)
(Continued)

(52) U.S. Cl.
CPC ............ *G06T 11/60* (2013.01); *G06F 3/0481* (2013.01); *G06F 3/04845* (2013.01); *G06T 11/001* (2013.01); *G06T 2200/24* (2013.01)

(58) Field of Classification Search
CPC .. G06F 3/0481; G06F 3/04845; G06T 11/001; G06T 2200/24
See application file for complete search history.

(56) References Cited

U.S. PATENT DOCUMENTS 8,487,932 B1 7/2013 Ward et al.
10,296,203 B2 * 5/2019 Jung ..................... G06F 3/0488
(Continued)

FOREIGN PATENT DOCUMENTS

CN 102308317 A 1/2012
CN 105183316 A 12/2015
(Continued)

OTHER PUBLICATIONS

Chinese Office Action dated Sep. 17, 2020, from Chinese Patent Application No. 2020101627133, International filing date Mar. 10, 2020. 10 pages.

(Continued)

*Primary Examiner* — Afroza Chowdhury
(74) *Attorney, Agent, or Firm* — ARENTFOX SCHIFF LLP

(57) ABSTRACT

An image drawing method, an apparatus, a readable medium and an electronic device. The method relates to the field of image processing technology, and includes: determining a drawing area corresponding to a target template image according to a display interface; acquiring a user input operation according to the display interface; and in response to determining that an operation position corresponding to the user input operation and the drawing area meet a preset condition, drawing an image according to the operation position.

15 Claims, 10 Drawing Sheets

(51) Int. Cl.
  *G06F 3/04845* (2022.01)
  *G06T 11/00* (2006.01)

(56) References Cited

U.S. PATENT DOCUMENTS

| | | | | |
|---|---|---|---|---|
| 10,835,802 | B1* | 11/2020 | Mayer | H02M 1/4216 |
| 2013/0346878 | A1* | 12/2013 | Mason | G06F 3/04886 |
| | | | | 715/753 |
| 2014/0022193 | A1 | 1/2014 | Kim et al. | |
| 2016/0357430 | A1 | 12/2016 | Migos et al. | |
| 2018/0357212 | A1* | 12/2018 | Windmark | G06F 40/216 |
| 2019/0235739 | A1 | 8/2019 | Bowen | |

FOREIGN PATENT DOCUMENTS

| | | |
|---|---|---|
| CN | 106250026 A | 12/2016 |
| CN | 106681706 A | 5/2017 |
| CN | 106709762 A | 5/2017 |
| CN | 106846040 A | 6/2017 |
| CN | 107765976 A | 3/2018 |
| CN | 109756787 A | 5/2019 |
| CN | 111399729 A | 7/2020 |

OTHER PUBLICATIONS

Chinese Office Action dated Dec. 14, 2020, from Chinese Patent Application No. 2020101627133, International filing date Mar. 10, 2020. 10 pages.
International Search Report dated May 11, 2021, from International Application No. PCT/CN2021/076413, International filing date Feb. 9, 2021. 10 pages.
Extended European Search Report in EP21767565.1, dated May 22, 2023, 8 pages.
"Photoshop Practical Course", New Century Higher Vocational Education Textbook editing Committee, Dalian University of Technology Press, Aug. 2004, p. 49.
Reexamination of Circular Information posted Oct. 19, 2023, in Chinese Application No. 202010162713.3.

* cited by examiner

IMAGE DRAWING METHOD BASED ON TARGET TEMPLATE IMAGE, APPARATUS, READABLE MEDIUM AND ELECTRONIC DEVICE

CROSS-REFERENCES TO RELATED APPLICATIONS

The present disclosure is a continuation of International Application No. PCT/CN2021/076413, filed on Feb. 9, 2021, which claims priority to Chinese Patent Application No. 202010162713.3, filed on Mar. 10, 2020. The content of the above applications are hereby incorporated by reference in their entireties.

TECHNICAL FIELD

The present disclosure relates to the field of image processing technologies and, in particular, to an image drawing method, an apparatus, a readable medium and an electronic device.

BACKGROUND

With continuous development of electronic information technology and image processing technology, image processing operations that can be provided on a terminal device are becoming more and more abundant. In order to add various interactive experiences for users, a user can draw various images by operations such as clicking or sliding on a display interface of the terminal device. The user's drawing process and a drawn image can be displayed on the display interface in real time. For example, an image such as a heart shape, a lightning shape, a gift box may be drawn. However, due to uneven personal painting levels of the users, drawn images may be quite different from desired images, which cannot express actual intentions of the users.

SUMMARY

The Summary section is provided in order to introduce concepts in a brief form, and these concepts will be described in detail in the following Description of Embodiments section. The Summary section is not intended to identify essential features or necessary features of the claimed technical solutions, nor is it intended to limit the scope of the claimed technical solutions.

In a first aspect, an embodiment of the present disclosure provides an image drawing method, including:
  determining a drawing area corresponding to a target template image according to a display interface;
  acquiring a user input operation according to the display interface; and
  in response to determining that an operation position corresponding to the user input operation and the drawing area meet a preset condition, drawing an image according to the operation position.

In a second aspect, an embodiment of the present disclosure provides an image drawing apparatus, including:
  an area determining module, configured to determine a drawing area corresponding to a target template image according to a display interface;
  an acquiring module, configured to acquire a user input operation according to the display interface; and
  a processing module, configured to: in response to determining that an operation position corresponding to the user input operation and the drawing area meet a preset condition, draw an image according to the operation position.

In a third aspect, an embodiment of the present disclosure provides a computer-readable medium, having a computer program stored thereon. When the program is executed by a processing apparatus, steps of the method according to the first aspect of the present disclosure are implemented.

In a fourth aspect, an embodiment of the present disclosure provides an electronic device, including:
  a storage apparatus, having a computer program stored thereon; and
  a processing apparatus, configured to execute the computer program in the storage apparatus to implement steps of the method according to the first aspect of the present disclosure.

In a fifth aspect, an embodiment of the present disclosure provides a computer program product, including a computer program carried on a computer-readable medium. When the computer program is executed by a computing device, the computing device is caused to implement the method according to the first aspect of the present disclosure.

In a sixth aspect, an embodiment of the present disclosure provides a computer program which, when running on an electronic device, causes the electronic device to implement the method according to the first aspect of the present disclosure.

Through the above technical solution of the present disclosure, the drawing area corresponding to the target template image is determined according to the display interface firstly, and then the user input operation by a user on the display interface is acquired; thereafter, in response to determining that the operation position corresponding to the user input operation and the drawing area meet the preset condition, the image is drawn according to the operation position.

Other features and advantages of the present disclosure will be described in detail in the following Description of Embodiments section.

BRIEF DESCRIPTION OF THE DRAWINGS

In combination with accompanying drawings and with reference to the following description of embodiments, the above and other features, advantages and aspects of the embodiments of the present disclosure will become more apparent. Throughout the drawings, a same or similar reference number represents a same or similar element. It should be understood that the drawings are schematic and that an original and an element are not necessarily drawn to scale.

DESCRIPTION OF EMBODIMENTS

Embodiments of the present disclosure will be described in more detail below with reference to the accompanying drawings. Although some embodiments of the present disclosure are shown in the accompanying drawings, it should be understood that the present disclosure may be implemented in various forms and should not be construed as limited to the embodiments set forth herein; on the contrary, these embodiments are provided for a more thorough and complete understanding of the present disclosure. It should be understood that the drawings and embodiments of the present disclosure are only for exemplary purposes and are not intended to limit the protection scope of the present disclosure.

It should be understood that steps described in method implementations of the present disclosure may be performed in different orders and/or in parallel. Furthermore, the method implementations may include additional steps and/or omit performing illustrated steps. The scope of the present disclosure is not limited in this regard.

As used herein, the term "including" and its variations are open-ended inclusion, that is, "including but not limited to". The term "based on" is "based at least in part on". The term "one embodiment" means "at least one embodiment"; the term "another embodiment" means "at least one other embodiment"; the term "some embodiments" means "at least some embodiments". Relevant definitions of other terms will be given in the following description.

It should be noted that concepts such as "first" and "second" mentioned in the present disclosure are only used to distinguish different apparatuses, modules or units, and are not used to limit an order or interdependence of functions performed by these apparatuses, modules or units.

It should be noted that modifications of "one" and "multiple" mentioned in the present disclosure are schematic rather than restrictive, and those skilled in the art should understand that they should be understood as "one or multiple" unless otherwise clearly indicated in the context.

The names of messages or information exchanged between multiple apparatuses in the implementations of the present disclosure are for illustrative purposes only, and are not intended to limit the scope of these messages or information.

Figure 1:
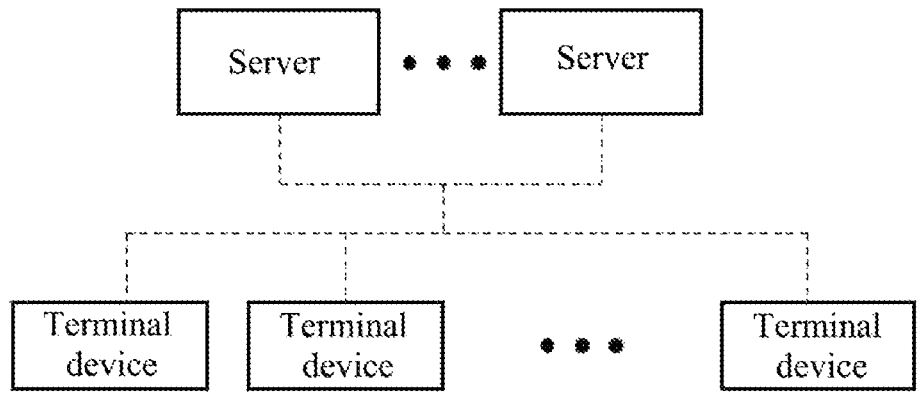
FIG. 1 is a schematic diagram of a deployment of a terminal device and a server.

Before introducing an image drawing method, an apparatus, a readable medium and an electronic device provided by the present disclosure, an application scenario involved in various embodiments of the present disclosure is first introduced. The application scenario may include a terminal device and a server, and data transmission may be carried out between the terminal device and the server. The terminal device may include, but is not limited to, a mobile terminal such as a mobile phone, a laptop, a digital broadcast receiver, a PDA (personal digital assistant), a PAD (portable android device), a PMP (portable multimedia player), an in-vehicle terminal (for example, an in-vehicle navigation terminal) and so on, and a fixed terminal such as a digital TV, a desktop computer and so on. The server may include, but is not limited to, a physical server, a server cluster, a cloud server or the like. In a specific implementation scenario, one or more terminal devices and one or more servers may be included as shown in FIG. 1, and data transmission between multiple terminal devices may be carried out through a server, so as to display synchronized content on each terminal device. In the embodiments provided by the present disclosure, an executive entity may be any of the above terminal devices.

Figure 2:
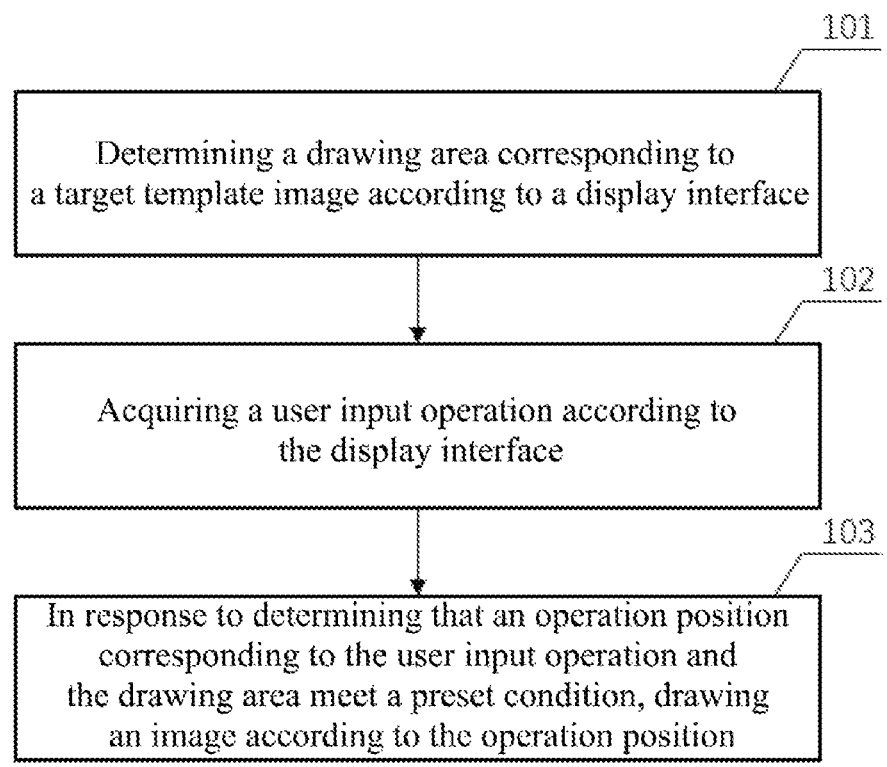
FIG. 2 is a flowchart of an image drawing method illustrated according to an exemplary embodiment.

FIG. 2 is a flowchart of an image drawing method illustrated according to an exemplary embodiment. As shown in FIG. 2, the method includes the following steps.

Step 101, determining a drawing area corresponding to a target template image according to a display interface.

For example, a terminal device currently runs an APP (English: Application) with an interactive function (such as drawing images), such as a video playback software, a live broadcast software, an instant messaging software, etc. A picture currently shown by the APP is displayed on a display interface of the terminal device. If a user needs to draw an image on the display interface, a specified target template may be selected on the terminal device by means of issuing an instruction. Then, the terminal device determines, according to the target template image indicated by the target template, the drawing area corresponding to the target template image on the display interface. It can be understood as that coordinate ranges of the drawing area on the display interface are determined according to a coordinate system of the target template image and the display interface. At the same time, the target template image indicated by the target template may also be displayed on the display interface for the user to view. It can be understood as that the target template contains all information of the target template image, and the target template image may be displayed according to the target template. The target template may be, for example, an image file in various formats, and may also be a binary file, etc.

The target template image may include multiple paths (which can be understood as lines), and the multiple paths may be divided upon whether they are closed, so as to obtain one or more closed drawing areas. For example, the target template image may be an image containing two heart shapes, so the drawing area may be an area where the two heart shapes are located when the target template image is displayed on the display interface. The target template image may also be an image containing a lightning shape, so the drawing area may be an area where the lightning shape is located when the target template image is displayed on the display interface.

Step 102, acquiring a user input operation according to the display interface.

As an example, if the user wants to draw an image on the display interface, a user input operation may be performed on the display interface by means of touching. The user input operation may be an operation such as a single-click, a double-click, sliding, dragging, a long press and so on, and may be preset by the APP or specified according to specific needs of the user, which is not specifically limited in the present disclosure. When the terminal device detects the user input operation on the display interface, an operation position where the user input operation occurs can be determined. The operation position may be understood as coordinates of the user input operation on the display interface. According to different user input operations and sensitivity of different display interfaces, the operation position may include coordinates of one point or coordinates of multiple points (that is, coordinate ranges).

Step 103, in response to determining that the operation position corresponding to the user input operation and the drawing area meet a preset condition, drawing an image according to the operation position.

As an example, in order to assist the user to draw an image consistent with a desired image (i.e., the target template image), whether to respond to the user input operation may be determined according to whether the operation position corresponding to the user input operation and the drawing area meet the preset condition. The preset condition may be used to limit a positional relationship between the operation position and the drawing area.

For example, the preset condition may be: the operation position being located within the drawing area, or the operation position being located outside the drawing area, or the operation position overlapping with an edge of the drawing area, or any combination of the above three preset conditions. The edge of the drawing area may be formed by a series of coordinates, and the operation position and the edge of the drawing area coinciding can be understood as that coordinates of the edge of the drawing area and coordinates of the operation position coincide. Taking the preset condition that the operation position is located within the drawing area as an example, if the operation position and the drawing area meet the preset condition, that is, the coordinates of the operation position are within the drawing area, then a response may be made to the user input operation, and the image is drawn on the display interface according to the operation position. At this time, a drawn track may be displayed at the coordinates of the operation position on the display interface. In this way, without setting a threshold for a drawing level, the user can accurately and quickly draw an image consistent with a desired image, which improves accuracy and efficiency of image drawing and improves the user's interactive experience.

To sum up, in the present disclosure, the drawing area corresponding to the target template image is determined according to the display interface firstly, and then the user input operation by the user on the display interface is acquired; thereafter, in response to determining that the operation position corresponding to the user input operation and the drawing area meet the preset condition, the image is drawn according to the operation position. In the present disclosure, when the user performs the user input operation on the display interface, through the drawing area corresponding to the target template image, the image is limited to be drawn only in the case that the operation position and the drawing area meet the preset condition, thereby assisting the user to draw the image in accordance with the target template image, and improving the accuracy and efficiency of image drawing.

Figure 3:
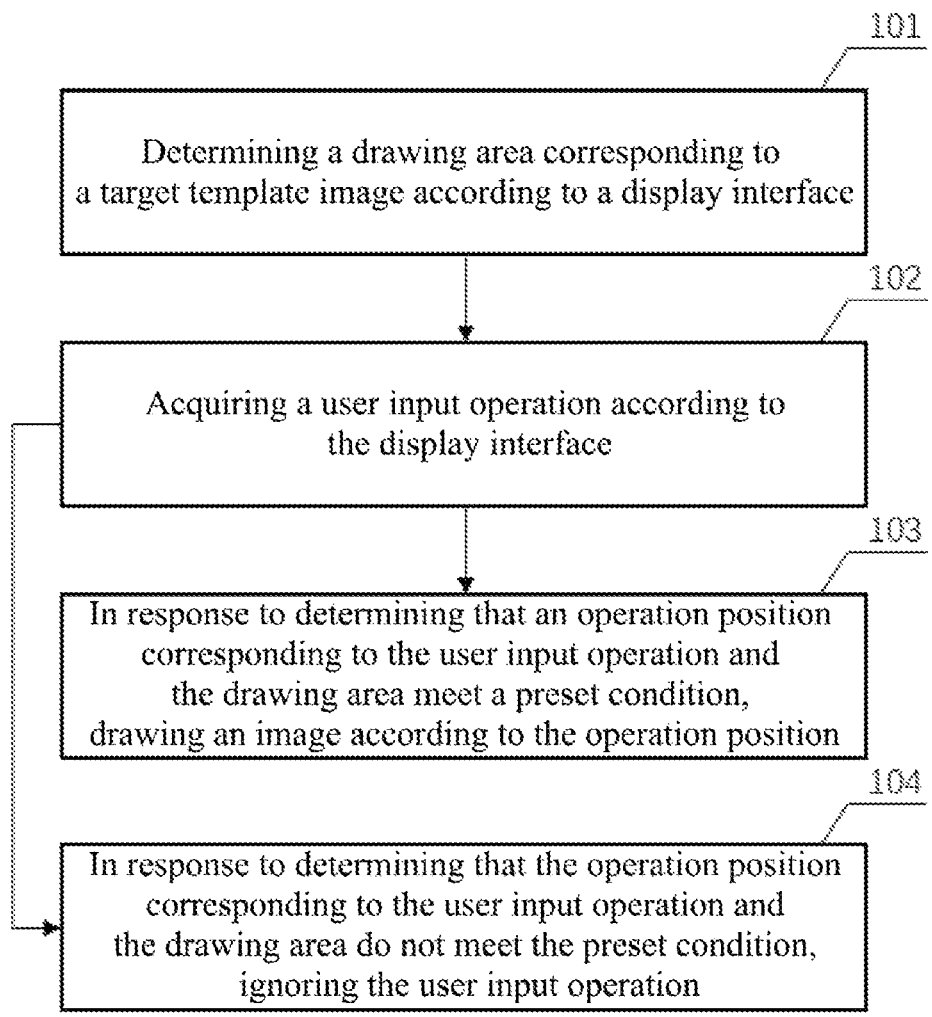
FIG. 3 is a flowchart of another image drawing method illustrated according to an exemplary embodiment.

FIG. 3 is a flowchart of an image drawing method illustrated according to an exemplary embodiment. As shown in FIG. 3, the method also includes:

step 104, in response to determining that the operation position corresponding to the user input operation and the drawing area do not meet the preset condition, ignoring the user input operation.

As an example, if the operation position and the drawing area do not meet the preset condition, the user input operation may be ignored, that is, no response is made to the user input operation, and accordingly, no drawn track will appear on the display interface. Taking the preset condition that the operation position is located within the drawing area as an example, if the operation position is located outside the drawing area, or the operation position overlaps with the edge of the drawing area, no drawn track will appear on the display interface. It should be noted that when the operation position is coordinate ranges, there may be a case that a part of coordinates of the operation position are located within the drawing area and the other part of the coordinates are located outside the drawing area (or overlap with the edge of the drawing area). Then the image may be drawn only at a position indicated by the part of the coordinates within the drawing area, that is, the drawn track may be displayed at the position indicated by the part of the coordinates within the drawing area, while no drawn track is displayed at a position indicated by the part of the coordinates outside the drawing area (or overlapping with the edge of the drawing area).

Figure 4:
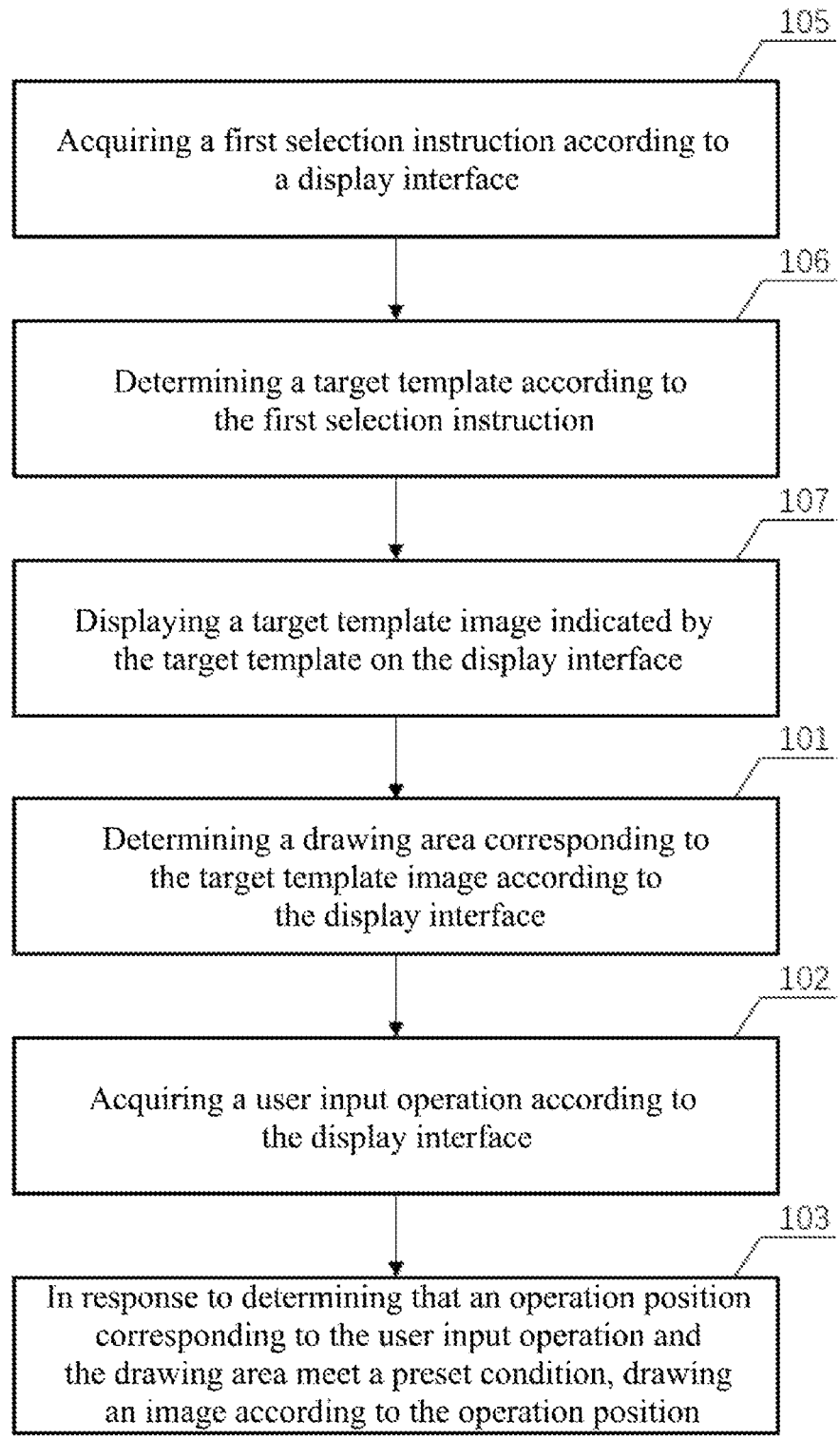
FIG. 4 is a flowchart of another image drawing method illustrated according to an exemplary embodiment.

FIG. 4 is a flowchart of an image drawing method illustrated according to an exemplary embodiment. As shown in FIG. 4, before step 101, the method also includes:

step 105, acquiring a first selection instruction according to the display interface;

step 106, determining a target template according to the first selection instruction; and step 107, displaying the target template image indicated by the target template on the display interface.

In a specific use scenario, the user issues the first selection instruction on the display interface to select the target template, so that the target template image is displayed on the display interface. For example, the user may perform a specified operation on the display interface, such as a single-click, a double-click, sliding, etc., to issue the first selection instruction.

Specifically, an implementation of step 106 may include any of the following three manners.

Manner 1: determining the target template indicated by the first selection instruction among multiple preset templates.

As an example, multiple pre-stored templates are displayed on the display interface of the terminal device. The user may trigger the first selection instruction by clicking different templates, and a template clicked by the user is the target template.

Manner 2: receiving the target template which is indicated by the first selection instruction and sent by a server.

Limited by a storage space of the terminal device and a version of the APP, templates stored on the terminal device are limited. In order to further meet the needs of the user, the target template sent by the server may be received. For example, the user may click an "update template" button or a "download template" button or other buttons in the APP to trigger the first selection instruction, so that the terminal device requests the target template from the server, and then the server sends the target template to the terminal device.

Manner 3: determining a local image indicated by the first selection instruction, and generating the target template according to the local image.

In another implementation, the user may have a need to define the target template by himself/herself, so the user may click different local images in a local library of the terminal device to trigger the first selection instruction. Then the local image may be processed in accordance with a preset rule, to extract image information in the local image as the target template. For example, the local image may be a jpg file. Firstly, edge recognition, color recognition or object semantic recognition may be performed on the local image to identify a specified area in the local mage, then format conversion is performed on image information in the specified area to convert it into an SVG (English: Scalable Vector Graphics) file, and the SVG file is used as the target template. For example, the local image is an image containing a car. The object semantic recognition may be performed firstly on the local image to identify an area where the car is located, then format conversion is performed on image information (pixel coordinates, color, etc.) contained in the area to convert it into an SVG file which is used as the target template, and then a car image (i.e. the target template image) is obtained according to the target template.

Figure 5A:
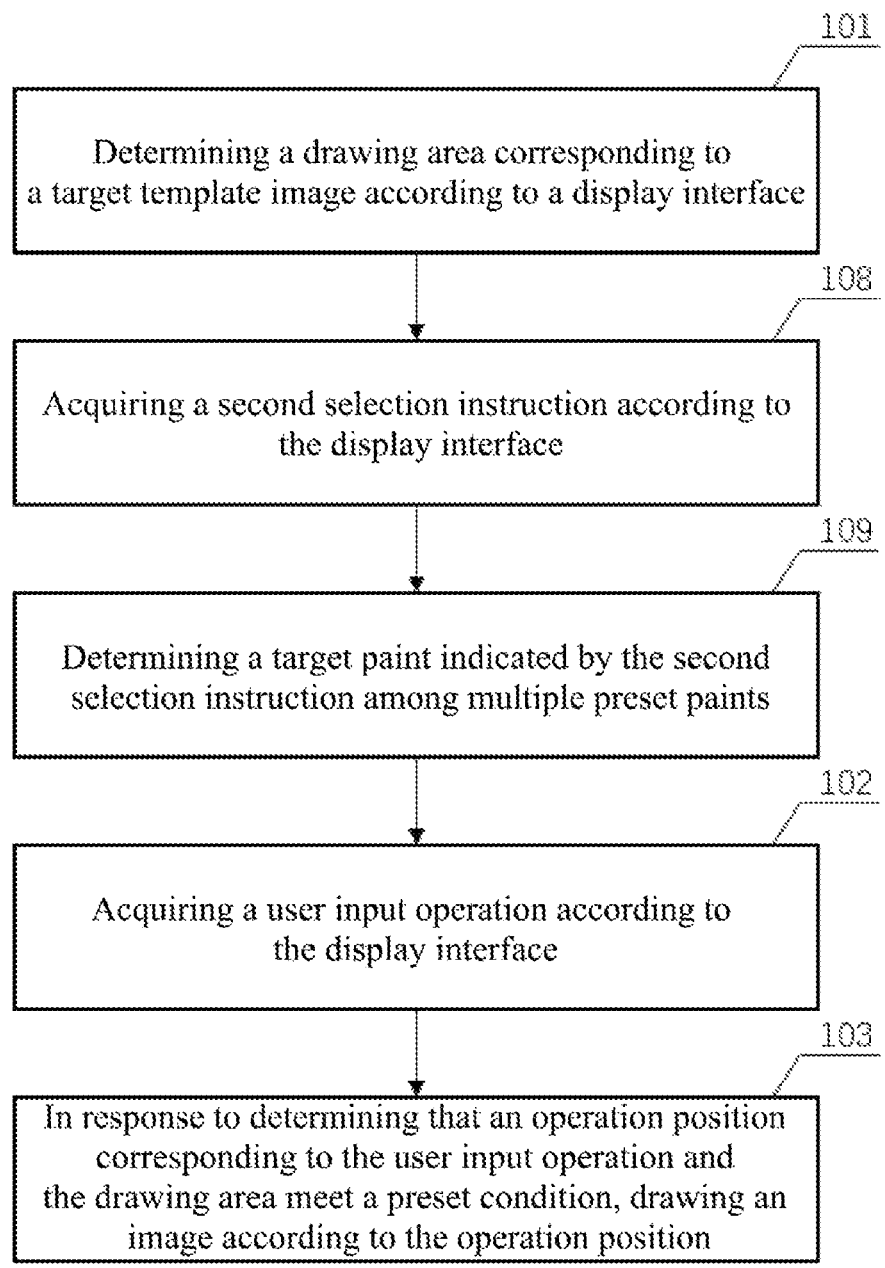
FIG. 5*a* is a flowchart of another image drawing method illustrated according to an exemplary embodiment.

FIG. 5a is a flowchart of another image drawing method illustrated according to an exemplary embodiment. As shown in FIG. 5a, before step 103, the method also includes:
step 108, acquiring a second selection instruction according to the display interface; and
step 109, determining a target paint indicated by the second selection instruction among multiple preset paints.
Accordingly, an implementation of step 103 may be:
drawing, in accordance with the target paint, the image according to the operation position.

Figure 5B:
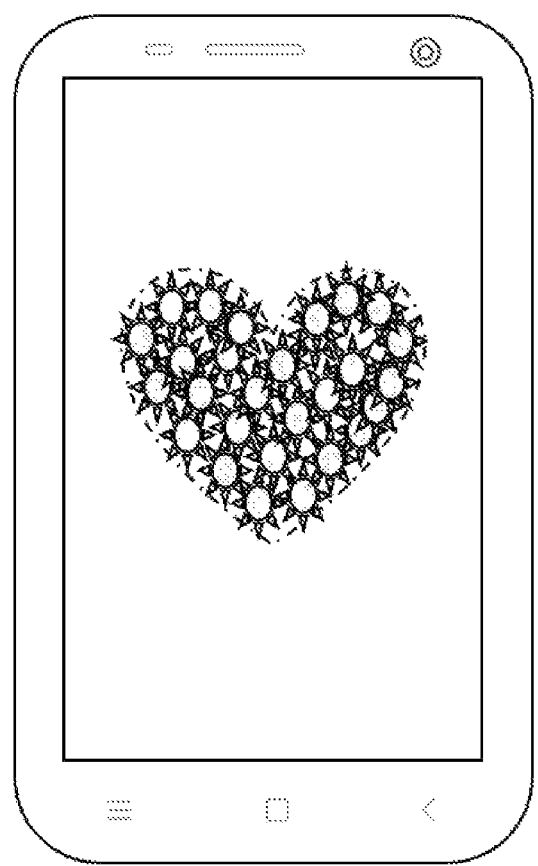
FIG. 5*b* is a schematic diagram of drawing of an image illustrated according to an exemplary embodiment.

For example, before performing the user input operation, the user may also issue the second selection instruction on the display interface to set different paints (Paints). Multiple pre-stored paints may be displayed on the terminal device, and the user triggers the second selection instruction by clicking different paints, a paint selected by the user being the target paint. The paint may be understood as a style of the drawn track on the display interface, and the paint may include a variety of paint attributes, such as: a draw color, a draw mode (including: content filling, stroking, etc.), a draw transparency, a draw connection style, a draw width, a draw line cap, etc. After the target paint is determined in step 109, the image may be drawn in accordance with the paint attributes of the target paint at the coordinates of the operation position. At this time, the drawn track may be displayed in accordance with the paint attributes at the coordinates of the operation position on the display interface. Taking the drawing area corresponding to the target template image selected by the user being a heart shape (an area surrounded by dotted lines), the preset condition being that the operation position corresponding to the user input operation is located within the drawing area, and the target paint being a sun paint as an example, the drawn track displayed on the display interface may be as shown in FIG. 5b, and a heart-shaped image filled with suns can be obtained.

Figure 6A:
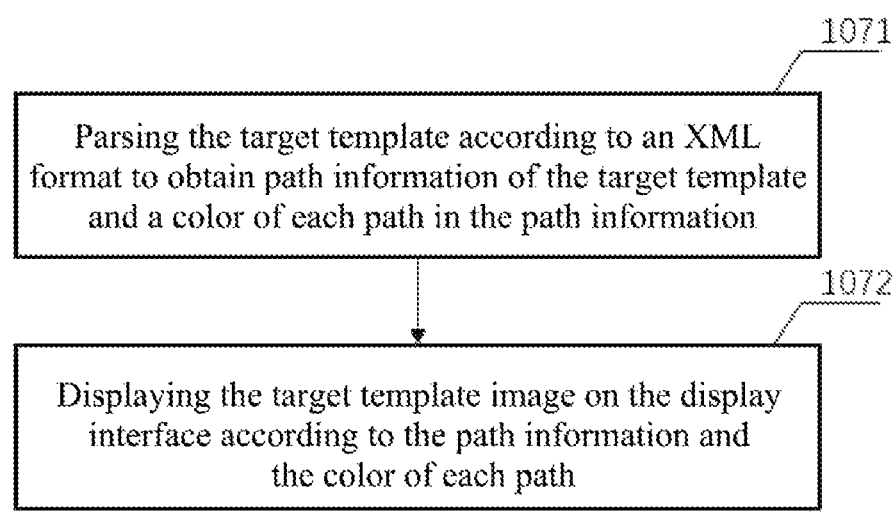
FIG. 6*a* is a flowchart of another image drawing method illustrated according to an exemplary embodiment.

FIG. 6a is a flowchart of another image drawing method illustrated according to an exemplary embodiment. As shown in FIG. 6a, the target template is a scalable vector graphics SVG file, and step 107 may include:
step 1071, parsing the target template in accordance with an XML format to obtain path information of the target template and a color of each path in the path information; and
step 1072, displaying the target template image on the display interface according to the path information and the color of each path.
Specifically, the target template may be an SVG file. After determining the target template, the terminal device first parses the target template in accordance with the XML (English: Extensible Markup Language) format to obtain the path information contained in the target template and the color corresponding to each path of multiple paths (Paths) included in the path information. Further, a color code corresponding to each path may be converted from a three-digit color code in the SVG file to a six-digit color code, so as to facilitate display on the terminal device. Finally, the target template image is displayed according to the path information and the color of each path.

Accordingly, step 101 may include:
determining the drawing area on the display interface according to the path information, the drawing area being a closed area formed by at least one path.

Figure 6B:
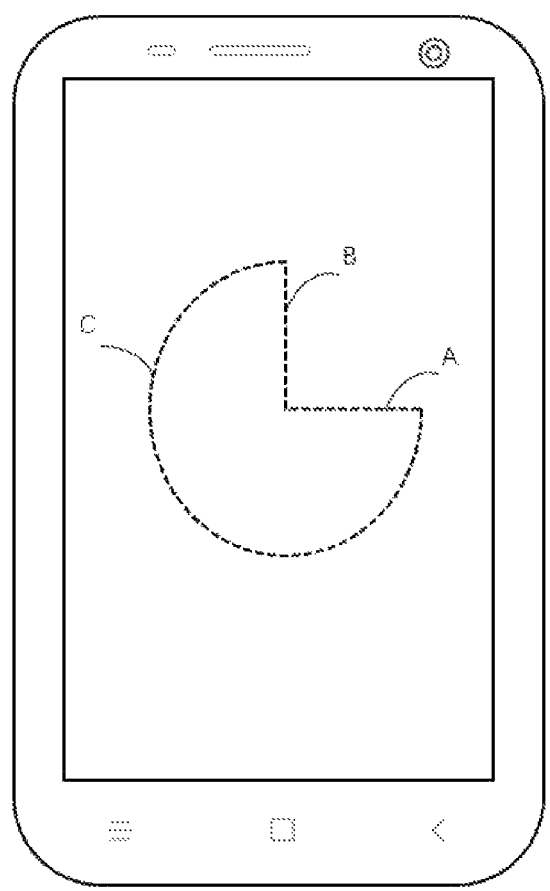
FIG. 6*b* is a schematic diagram of a drawing area illustrated according to an exemplary embodiment.

As an example, in step 1071, the path information included in the target template is obtained. Then it can be determined, according to all paths included in the path information, how many closed areas the target template image may be divided into by the all paths, and then these closed areas may be used as the drawing area. As shown in FIG. 6b, the path information includes path A, path B and path C. A, B and C are connected end to end, and may form a closed area. Then, an area formed by A, B and C may be used as the drawing area.

Figure 7:
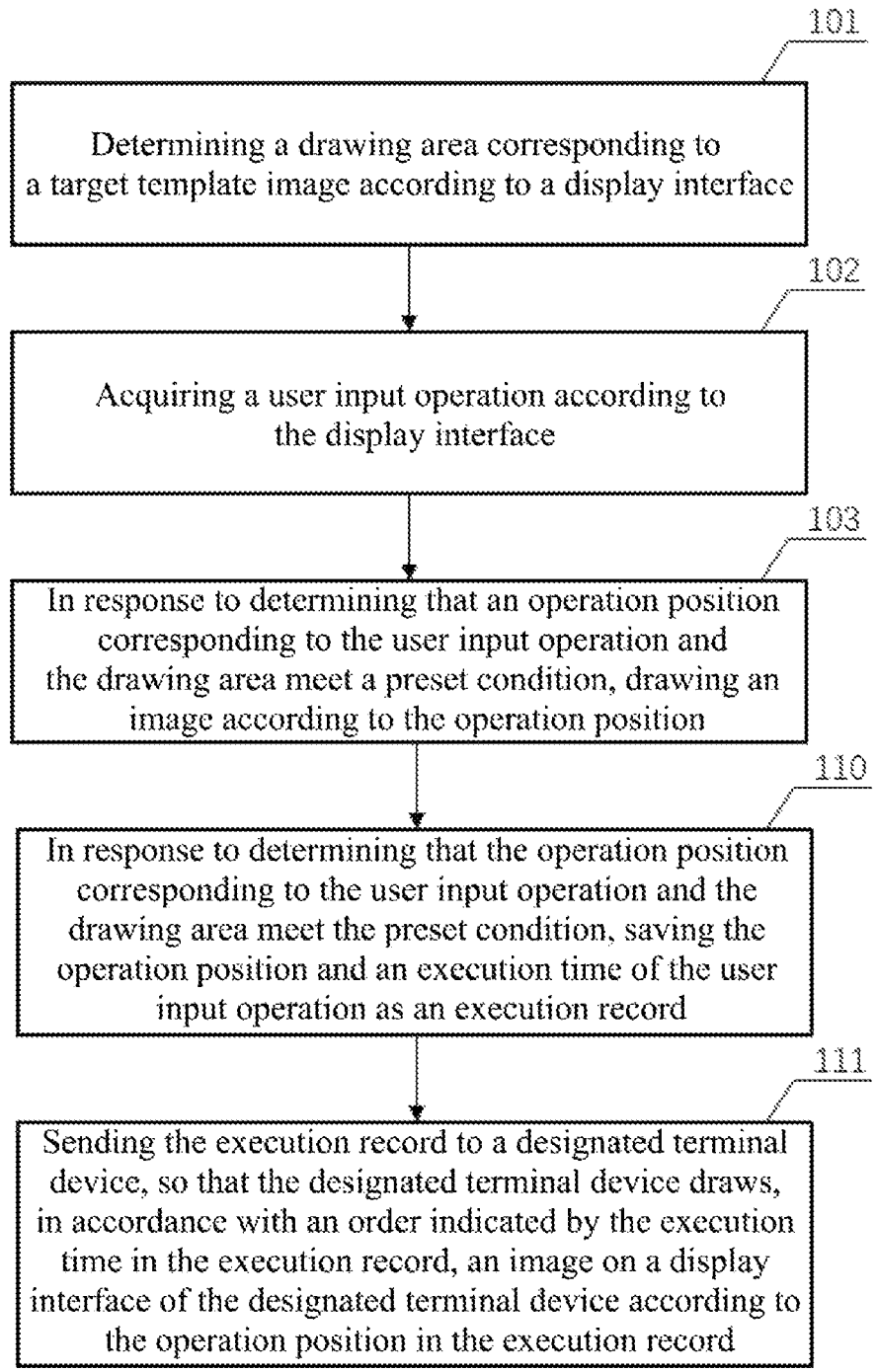
FIG. 7 is a flowchart of another image drawing method illustrated according to an exemplary embodiment.

FIG. 7 is a flowchart of another image drawing method illustrated according to an exemplary embodiment. As shown in FIG. 7, the method also includes:
step 110, in response to determining that the operation position corresponding to the user input operation and the drawing area meet the preset condition, saving the operation position and an execution time of the user input operation as an execution record; and
step 111, sending the execution record to a designated terminal device, so that the designated terminal device draws, in accordance with an order indicated by the execution time in the execution record, an image on a display interface of the designated terminal device according to the operation position in the execution record.

For example, in order to further improve the user's interactive experience, an image drawing process in the above embodiments may also be sent to a designated terminal device, so that the image drawing process can also be seen on the designated terminal device, where the designated terminal device may be any terminal device other than the current terminal device that performs the above image drawing method. Taking the APP running on the current terminal device being a live broadcast APP as an example, the designated terminal device may be any terminal device in a same live broadcast room as the current terminal device, including a terminal device used by an anchor of the live broadcast room, and a terminal device used by an audience in the live broadcast room.

Specifically, when the user performs the user input operation, the operation position of each user input operation and the execution time of the user input operation may be recorded, and then the operation position and the corresponding execution time may be saved as the execution record. The execution record may also include paint information for indicating the target paint, so as to indicate the style of the drawn track this time. After the user triggers a sending instruction on the display interface, all the execution records obtained can be sent to the designated terminal device. For example, the user can click a "send" button on the display interface to trigger the sending instruction after no more user input operation will be performed (i.e. stopping drawing). It may also be the case that each time an execution record is saved, the execution record is sent to the designated terminal device. After receiving the execution record, the designated terminal device may draw, in accordance with the order indicated by the execution time in the execution record, the image at a position indicated by the operation position in the execution record on the display interface of the designated terminal device. In this way, a user of the designated terminal device can also watch the drawing process of the current terminal device, which improves the user's interactive experience.

For example, if an audience in a live broadcast room wants to send a heart-shaped image to an anchor of the live broadcast room, a template corresponding to the heart-shaped image may be selected on a smart phone and a gift icon (icon) may be selected as a paint. Then the drawing area is a heart shape, and when the user slides (i.e. performing the user input operation) on the display interface, if the user slides within the drawing area, an image will be drawn at corresponding operation positions in accordance with the gift icon. After the drawing is completed, a heart-shaped image filled with gift icons is obtained. The user clicks the "send" button to send execution records in the drawing process to each terminal device in the live broadcast room, and the drawing process of this heart-shaped image can be displayed on the display interface of each terminal device.

To sum up, in the present disclosure, the drawing area corresponding to the target template image is determined according to the display interface firstly, and then the user input operation by the user is acquired on the display interface; thereafter, in response to determining that the operation position corresponding to the user input operation and the drawing area meet the preset condition, the image is drawn according to the operation position. In the present disclosure, when the user performs the user input operation on the display interface, through the drawing area corresponding to the target template image, the image is limited to be drawn only in the case that the operation position and the drawing area meet the preset condition, thereby assisting the user to draw the image in accordance with the target template image, and improving accuracy and efficiency of image drawing.

Figure 8:
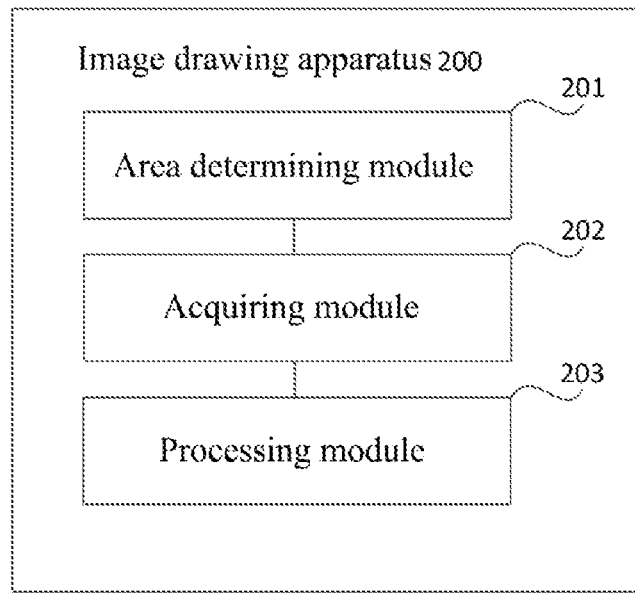
FIG. 8 is a block diagram of an image drawing apparatus illustrated according to an exemplary embodiment.

FIG. 8 is a block diagram of an image drawing apparatus illustrated according to an exemplary embodiment. As shown in FIG. 8, the apparatus 200 includes:
- an area determining module 201, configured to determine a drawing area corresponding to a target template image according to a display interface;
- an acquiring module 202, configured to acquire a user input operation according to the display interface; and
- a processing module 203, configured to: in response to determining that an operation position corresponding to the user input operation and the drawing area meet a preset condition, draw an image according to the operation position.

Further, the processing module 203 is further configured to:
- in response to determining that the operation position corresponding to the user input operation and the drawing area do not meet the preset condition, ignore the user input operation.

The preset condition includes one or more of the following:
- the operation position corresponding to the user input operation being located within the drawing area;
- the operation position corresponding to the user input operation being located outside the drawing area; and
- the operation position corresponding to the user input operation overlapping with an edge of the drawing area.

Figure 9:
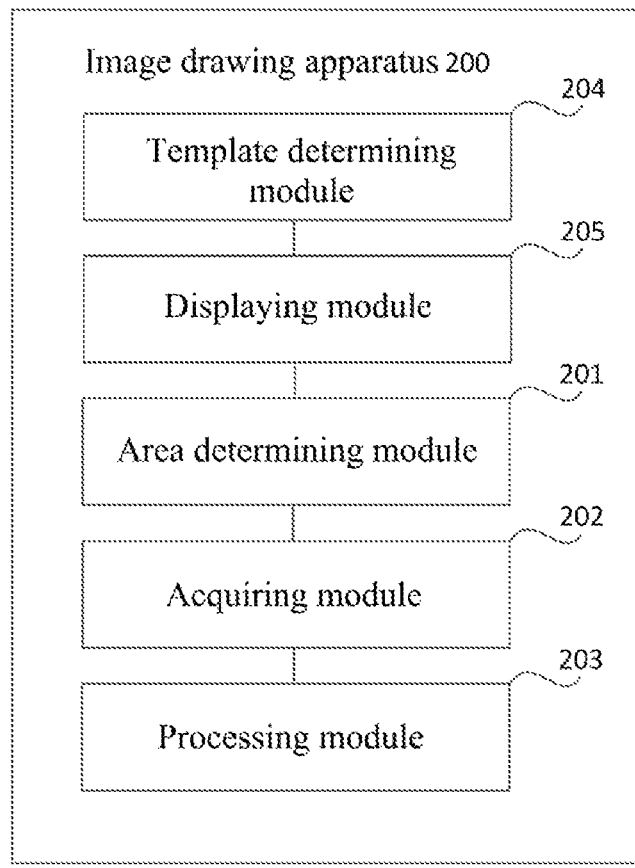
FIG. 9 is a block diagram of another image drawing apparatus illustrated according to an exemplary embodiment.

FIG. 9 is a block diagram of another image drawing apparatus illustrated according to an exemplary embodiment. As shown in FIG. 9, the acquiring module 202 is further configured to acquire a first selection instruction according to the display interface before the drawing area corresponding to the target template image is determined.

The apparatus 200 also includes:
- a template determining module 204, configured to determine a target template according to the first selection instruction; and
- a displaying module 205, configured to display the target template image indicated by the target template on the display interface.

In an implementation, the template determining module 204 may be configured to perform any of the following steps:
- step 1) determining the target template indicated by the first selection instruction among multiple preset templates; or,
- step 2) receiving the target template which is indicated by the first selection instruction and sent by a server; or,
- step 3) determining a local image indicated by the first selection instruction, and generating the target template according to the local image.

Figure 10:
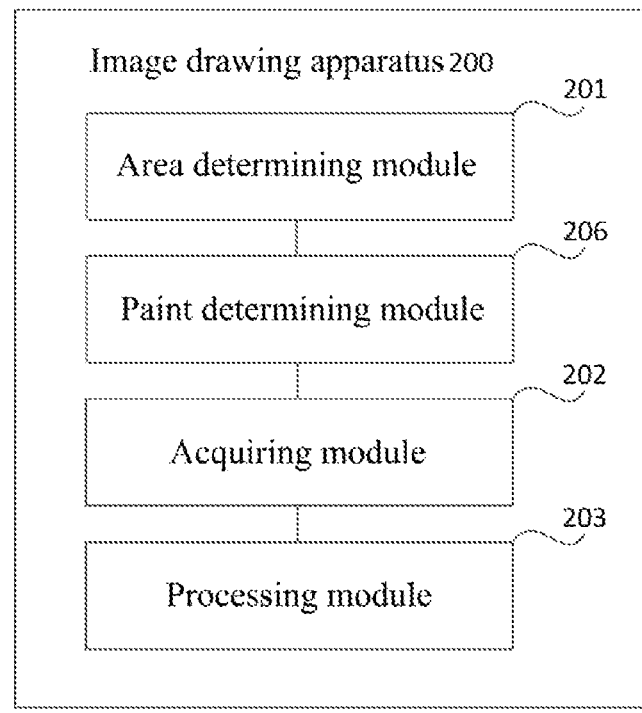
FIG. 10 is a block diagram of another image drawing apparatus illustrated according to an exemplary embodiment.

FIG. 10 is a block diagram of another image drawing apparatus illustrated according to an exemplary embodiment. As shown in FIG. 10, the acquiring module 202 is further configured to acquire a second selection instruction according to the display interface before the image is drawn according to the operation position in response to determining that the operation position corresponding to the user input operation and the drawing area meet the preset condition.

The apparatus 200 also includes:
- a paint determining module 206, configured to determining a target paint indicated by the second selection instruction.

Accordingly, the processing module 203 is configured to draw, in accordance with the target paint, the image according to the operation position.

Figure 11:
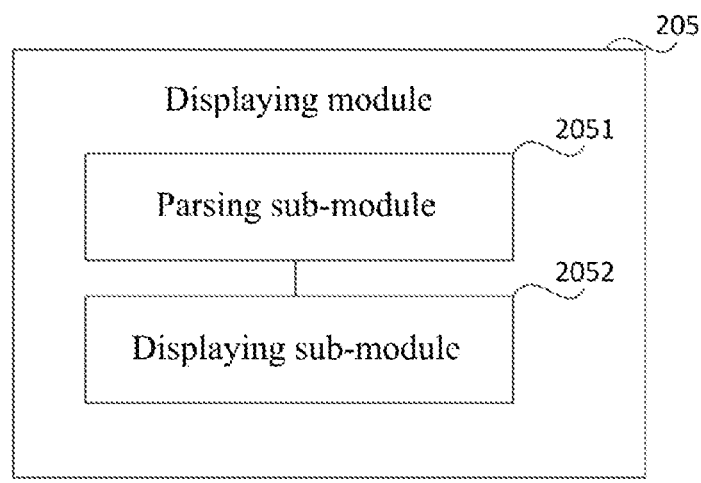
FIG. 11 is a block diagram of another image drawing apparatus illustrated according to an exemplary embodiment.

FIG. 11 is a block diagram of another image drawing apparatus illustrated according to an exemplary embodiment. As shown in FIG. 11, the target template is a scalable vector graphics SVG file, and the displaying module 205 includes:
- a parsing sub-module 2051, configured to parse the target template in accordance with an extensible markup language XML format to obtain path information of the target template and a color of each path in the path information; and
- a displaying sub-module 2052, configured to display the target template image on the display interface according to the path information and the color of each path.

Accordingly, the area determining module 201 is configured to:
- determine the drawing area on the display interface according to the path information, the drawing area being a closed area formed by at least one path.

Figure 12:
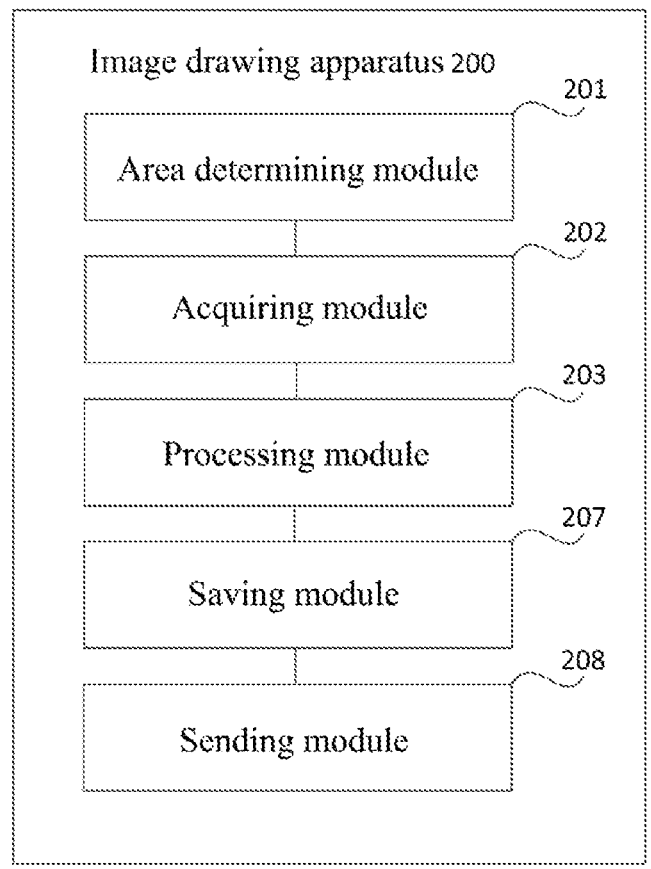
FIG. 12 is a block diagram of another image drawing apparatus illustrated according to an exemplary embodiment.

FIG. 12 is a block diagram of another image drawing apparatus illustrated according to an exemplary embodiment. As shown in FIG. 12, the apparatus 200 also includes:
- a saving module 207, configured to: in response to determining that the operation position corresponding to the user input operation and the drawing area meet the preset condition, save the operation position and an execution time of the user input operation as an execution record; and a sending module 208, configured to send the execution record to a designated terminal device, so that the designated terminal device draws, in accordance with an order indicated by the execution time in the execution record, an image on a display interface of the designated terminal device according to the operation position in the execution record.

Regarding the apparatuses in the above-mentioned embodiments, specific manners in which the modules perform operations have been described in detail in the method embodiments, and will not be described in detail here.

To sum up, in the present disclosure, the drawing area corresponding to the target template image is determined according to the display interface firstly, and then the user input operation by the user is acquired on the display interface; thereafter, in response to determining that the operation position corresponding to the user input operation and the drawing area meet the preset condition, the image is drawn according to the operation position. In the present disclosure, when the user performs the user input operation on the display interface, through the drawing area corresponding to the target template image, the image is limited to be drawn only in the case that the operation position and the drawing area meet the preset condition, thereby assisting the user to draw the image in accordance with the target template image, and improving accuracy and efficiency of image drawing.

Figure 13:
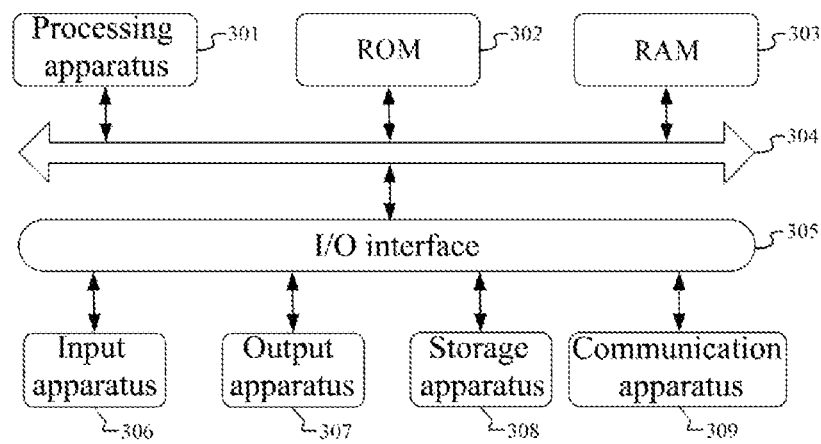
FIG. 13 is a schematic structural diagram of an electronic device illustrated according to an exemplary embodiment.

Referring to FIG. 13 now, FIG. 13 shows a schematic structural diagram of an electronic device (such as a terminal device or a server in FIG. 1) 300 suitable for implementing embodiments of the present disclosure. The terminal device in the embodiments of the present disclosure may include, but is not limited to, a mobile terminal such as a mobile phone, a laptop, a digital broadcast receiver, a PDA (personal digital assistant), a PAD (portable android device), a PMP (portable multimedia player), an in-vehicle terminal (for example, in-vehicle navigation terminal) and so on, and a fixed terminal such as a digital TV, a desktop computer and so on. The electronic device shown in FIG. 13 is only an example and should not impose any restriction on the functions and scope of use of the embodiments of the present disclosure.

As shown in FIG. 13, the electronic device 300 may include a processing apparatus (for example, a central processing unit, a graphics processor, etc.) 301, which may execute various appropriate actions and processing according to a program stored in a read only memory (ROM) 302 or a program loaded from a storage apparatus 308 into a random access memory (RAM) 303. Various programs and data required for operations of the electronic device 300 are also stored in the RAM 303. The processing apparatus 301, the ROM 302 and the RAM 303 are connected to each other through a bus 304. An input/output (I/O) interface 305 is also connected to the bus 304.

Generally, the following apparatuses may be connected to the I/O interface 305: an input apparatus 306 including, for example, a touch screen, a touch pad, a keyboard, a mouse, a camera, a microphone, an accelerometer, a gyroscope, etc.; an output apparatus 307 including, for example, a liquid crystal display (LCD), a speaker, a vibrator, etc.; the storage apparatus 308 including, for example, a magnetic tape, a hard disk, etc.; and a communication apparatus 309. The communication apparatus 309 may allow the electronic device 300 to communicate wirelessly or through wires with other devices to exchange data. Although FIG. 13 shows the electronic device 300 having various apparatuses, it should be understood that not all of the illustrated apparatuses are required to be implemented or provided. More or fewer apparatuses may alternatively be implemented or provided.

In particular, according to an embodiment of the present disclosure, processes described above with reference to flowcharts may be implemented as a computer software program. For example, an embodiment of the present disclosure includes a computer program product including a computer program carried on a non-transitory computer-readable medium, the computer program including a program code for executing the methods illustrated in the flowcharts. In such an embodiment, the computer program may be downloaded and installed from a network through the communication apparatus 309, or installed from the storage apparatus 308, or installed from the ROM 302. When the computer program is executed by the processing apparatus 301, the above-mentioned functions defined in the methods of the embodiments of the present disclosure are executed. An embodiment of the present disclosure also includes a computer program that, when executed on the electronic device 300, executes the above functions defined in the methods of the embodiments of the present disclosure.

It should be noted that the computer-readable medium of the present disclosure may be a computer-readable signal medium or a computer-readable storage medium, or a combination of the above two. The computer-readable storage medium may be, for example, but is not limited to, an electrical, magnetic, optical, electromagnetic, infrared or semiconductor system, apparatus or device, or any combination of the above. More specific examples of the computer-readable storage medium may include, but are not limited to, an electrical connection with one or more wires, a portable computer disk, a hard disk, a random access memory (RAM), a read only memory (ROM), an erasable programmable read only memory (EPROM or flash), an optical fiber, a compact disc read only memory (CD-ROM), an optical storage device, a magnetic storage device, or any suitable combination of the above. In the present disclosure, the computer-readable storage medium may be any tangible medium containing or storing a program, and the program may be used by, or used in combination with, an instruction execution system, apparatus or device. In the present disclosure, the computer-readable signal medium may include a data signal propagated in a baseband or as a part of a carrier wave, in which a computer-readable program code is carried. Such propagated data signal may take a variety of forms, including but not limited to an electromagnetic signal, an optical signal or a suitable combination of the above. The computer-readable signal medium may also be any computer-readable medium other than the computer-readable storage medium, and the computer-readable signal medium may send, propagate, or transmit a program for use by, or use in combination with, an instruction execution system, apparatus or device. The program code contained on the computer-readable medium may be transmitted with any suitable medium, including but not limited to: a wire, an optical cable, RF (radio frequency) or the like, or any suitable combination of the above.

In some implementations, the terminal device and the server may communicate using any currently known or future developed network protocol such as HTTP (Hyper Text Transfer Protocol), and may interconnect with any form or medium of digital data communication (for example, a communication network). Examples of the communication network include a local area network ("LAN"), a wide area network ("WAN"), an internet (for example, the Internet), and an end-to-end network (for example, an ad hoc end-to-end network), and any currently known or future developed network.

The computer-readable medium may be included in the electronic device; or may also exist alone without being assembled into the electronic device.

The computer-readable medium carries one or more programs. When the one or more programs are executed by the electronic device, the electronic device is caused to: determine a drawing area corresponding to a target template image according to a display interface; acquire a user input operation according to the display interface; and in response to determining that an operation position corresponding to the user input operation and the drawing area meet a preset condition, draw an image according to the operation position A computer program code for performing operations of the present disclosure may be written in one or more programming languages or combinations thereof. The programming languages include, but are not limited to: object-oriented programming languages such as Java, Smalltalk, C++, and also include conventional procedural programming languages such as "C" language or similar programming languages. The program code may be executed completely on a user computer, partially on a user computer, as an independent software package, partially on a user computer and partially on a remote computer, or completely on a remote computer or a server. In a case involving the remote computer, the remote computer may be connected to the user computer through any kind of network, including a local area network (LAN) or a wide area network (WAN), or may be connected to an external computer (for example, connected through the Internet using an Internet service provider).

The flowcharts and block diagrams in the accompanying drawings illustrate architectures, functions and operations of possible implementations of systems, methods and computer program products according to various embodiments of the present disclosure. In this regard, each block in the flowcharts or block diagrams may represent a module, a program segment, or a part of code that contains one or more executable instructions for implementing a specified logical function. It should also be noted that in some alternative implementations, the functions marked in the blocks may also occur in a different order than those marked in the drawings. For example, two blocks represented successively may actually be executed basically in parallel, or may sometimes be executed in an opposite order, depending on the function involved. It should also be noted that each block in the block diagrams and/or flowcharts and the combination of blocks in the block diagrams and/or flowcharts may be implemented by a dedicated hardware-based system performing specified functions or operations, or by a combination of dedicated hardware and computer instructions.

The modules described in the embodiments of the present disclosure may be implemented in software, and may also be implemented in hardware. In some cases, names of the modules do not limit the modules per se. For example, the area determining module may also be described as "a module that determines a drawing area".

The functions described above herein may be performed at least in part by one or more hardware logic components. For example, without limitation, exemplary types of the hardware logic components that may be used include: a field programmable gate array (FPGA), an application specific integrated circuit (ASIC), an application specific standard parts (ASSP), a system on chip (SOC), a complex programmable logic device (CPLD), etc.

In the context of the present disclosure, a machine-readable medium may be a tangible medium that may contain or store a program for use by, or use in combination with, an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination of the above. More specific examples of the machine-readable storage medium would include an electrical connection based on one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above.

According to one or more embodiments of the present disclosure, Example 1 provides an image drawing method, including: determining a drawing area corresponding to a target template image according to a display interface; acquiring a user input operation according to the display interface; and in response to determining that an operation position corresponding to the user input operation and the drawing area meet a preset condition, drawing an image according to the operation position.

According to one or more embodiments of the present disclosure, Example 2 provides the method of Example 1, and further includes: in response to determining that the operation position corresponding to the user input operation and the drawing area do not meet the preset condition, ignoring the user input operation.

According to one or more embodiments of the present disclosure, Example 3 provides the method of Example 1 or 2, where the preset condition includes one or more of the following: the operation position corresponding to the user input operation being located within the drawing area; the operation position corresponding to the user input operation being located outside the drawing area; and the operation position corresponding to the user input operation overlapping with an edge of the drawing area.

According to one or more embodiments of the present disclosure, Example 4 provides the method of Example 1, where before determining the drawing area corresponding to the target template image according to the display interface, the method further includes: acquiring a first selection instruction according to the display interface; determining a target template according to the first selection instruction; and displaying the target template image indicated by the target template on the display interface.

According to one or more embodiments of the present disclosure, Example 5 provides the method of Example 4, where determining the target template according to the first selection instruction includes: determining the target template indicated by the first selection instruction among multiple preset templates; or, receiving the target template which is indicated by the first selection instruction and sent by a server; or, determining a local image indicated by the first selection instruction, and generating the target template according to the local image.

According to one or more embodiments of the present disclosure, Example 6 provides the method of Example 1, where before in response to determining that the operation position corresponding to the user input operation and the drawing area meet the preset condition, drawing the image according to the operation position, the method further includes: acquiring a second selection instruction according to the display interface; and determining a target paint indicated by the second selection instruction among multiple preset paints. Drawing the image according to the operation position includes: drawing, in accordance with the target paint, the image according to the operation position.

According to one or more embodiments of the present disclosure, Example 7 provides the method of Example 4, where the target template is a scalable vector graphics SVG file, and displaying the target template image indicated by the target template on the display interface includes: parsing the target template in accordance with an extensible markup language XML format to obtain path information of the target template and a color of each path in the path information; and displaying the target template image on the display interface according to the path information and the color of each path.

According to one or more embodiments of the present disclosure, Example 8 provides the method of Example 7, where determining the drawing area corresponding to the target template image according to the display interface includes: determining the drawing area on the display interface according to the path information, the drawing area being a closed area formed by at least one path.

According to one or more embodiments of the present disclosure, Example 9 provides the method of Example 1, and the method further includes: in response to determining that the operation position corresponding to the user input operation and the drawing area meet the preset condition, saving the operation position and an execution time of the user input operation as an execution record; and sending the execution record to a designated terminal device, so that the designated terminal device draws, in accordance with an order indicated by the execution time in the execution record, an image on a display interface of the designated terminal device according to the operation position in the execution record.

According to one or more embodiments of the present disclosure, Example 10 provides an image drawing apparatus, including: an area determining module, configured to determine a drawing area corresponding to a target template image according to a display interface; an acquiring module, configured to acquire a user input operation according to the display interface; and a processing module, configured to: in response to determining that an operation position corresponding to the user input operation and the drawing area meet a preset condition, draw an image according to the operation position.

According to one or more embodiments of the present disclosure, Example 11 provides a computer-readable medium, having a computer program stored thereon. When the program is executed by a processing apparatus, the steps of the methods according to Examples 1-9 are implemented.

According to one or more embodiments of the present disclosure, Example 12 provides an electronic device, including: a storage apparatus, having a computer program stored thereon; and a processing apparatus, configured to execute the computer program in the storage apparatus to implement the steps of the methods according to Examples 1-9.

The above description is only preferred embodiments of the present disclosure and an illustration of technical principles employed. Those skilled in the art should understand that the disclosure scope involved in the present disclosure is not limited to the technical solutions formed by the specific combination of above technical features, but also covers other technical solutions formed by arbitrary combination of the above technical features or their equivalent features without departing from the above disclosed concept, for example, a technical solution formed by replacing the above features with (but not limited to) the technical features with similar functions disclosed in the present disclosure.

In addition, although operations are described in a specific order, this should not be understood as requiring the operations to be performed in a specific order shown or in a sequential order. Under certain circumstances, multitasking and parallel processing may be advantageous. Similarly, although several specific implementation details are contained in the above discussion, these should not be interpreted as limiting the scope of the present disclosure. Certain features described in the context of separate embodiments may also be implemented in combination in a single embodiment. Conversely, various features described in the context of a single embodiment may also be implemented in multiple embodiments separately or in any suitable sub-combinations.

Although the present subject matter has been described in a language specific to structural features and/or logical actions of methods, it should be understood that the subject matter defined in appended claims is not necessarily limited to the specific features or actions described above. On the contrary, the specific features and actions described above are only exemplary forms for implementing the claims. Regarding the apparatuses in the above embodiments, specific manners in which the modules perform operations have been described in detail in the method embodiments, and will not be described in detail here.

What is claimed is:

1. An image drawing method, comprising:
   determining a drawing area corresponding to a target template image according to a display interface;
   acquiring a user input operation according to the display interface;
   in response to determining that an operation position corresponding to the user input operation and the drawing area meet a preset condition, drawing an image according to the operation position, wherein an area of the image is consistent with the drawing area corresponding to the target template image, and the drawing area corresponding to the target template image is an area where the target template image is located; and
   in response to determining that the operation position corresponding to the user input operation and the drawing area do not meet the preset condition, ignoring the user input operation;
   wherein the preset condition comprises:
   the operation position corresponding to the user input operation being located within the drawing area; or
   the operation position corresponding to the user input operation overlapping with an edge of the drawing area.

2. The method according to claim 1, before determining the drawing area corresponding to the target template image according to the display interface, further comprising:
   acquiring a first selection instruction according to the display interface;
   determining a target template according to the first selection instruction; and
   displaying the target template image indicated by the target template on the display interface.

3. The method according to claim 2, wherein determining the target template according to the first selection instruction comprises:
  determining the target template indicated by the first selection instruction among multiple preset templates; or,
  receiving the target template which is indicated by the first selection instruction and sent by a server; or,
  determining a local image indicated by the first selection instruction, and generating the target template according to the local image.

4. The method according to claim 2, wherein the target template is a scalable vector graphics (SVG) file, and displaying the target template image indicated by the target template on the display interface comprises:
  parsing the target template in accordance with an extensible markup language (XML) format to obtain path information of the target template and a color of each path in the path information; and
  displaying the target template image on the display interface according to the path information and the color of each path.

5. The method according to claim 4, wherein determining the drawing area corresponding to the target template image according to the display interface comprises:
  determining the drawing area on the display interface according to the path information, the drawing area being a closed area formed by at least one path.

6. The method according to claim 1, before in response to determining that the operation position corresponding to the user input operation and the drawing area meet the preset condition, drawing the image according to the operation position, further comprising:
  acquiring a second selection instruction according to the display interface; and
  determining a target paint indicated by the second selection instruction among multiple preset paints;
  wherein drawing the image according to the operation position comprises:
  drawing, in accordance with the target paint, the image according to the operation position.

7. The method according to claim 1, further comprising:
  in response to determining that the operation position corresponding to the user input operation and the drawing area meet the preset condition, saving the operation position and an execution time of the user input operation as an execution record; and
  sending the execution record to a designated terminal device, so that the designated terminal device draws, in accordance with an order indicated by the execution time in the execution record, an image on a display interface of the designated terminal device according to the operation position in the execution record.

8. An image drawing apparatus, comprising:
  a memory, having a computer program stored thereon; and
  a processor, configured to:
  determine a drawing area corresponding to a target template image according to a display interface;
  acquire a user input operation according to the display interface;
  in response to determining that an operation position corresponding to the user input operation and the drawing area meet a preset condition, draw an image according to the operation position, wherein an area of the image is consistent with the drawing area corresponding to the target template image, and the drawing area corresponding to the target template image is an area where the target template image is located; and
  in response to determining that the operation position corresponding to the user input operation and the drawing area do not meet the preset condition, ignore the user input operation;
  wherein the preset condition comprises:
  the operation position corresponding to the user input operation being located within the drawing area; or
  the operation position corresponding to the user input operation overlapping with an edge of the drawing area.

9. The apparatus according to claim 8, wherein the processor is further configured to:
  acquire a first selection instruction according to the display interface;
  determine a target template according to the first selection instruction; and
  display the target template image indicated by the target template on the display interface.

10. The apparatus according to claim 9, wherein the processor is further configured to:
  determine the target template indicated by the first selection instruction among multiple preset templates; or,
  receive the target template which is indicated by the first selection instruction and sent by a server; or,
  determine a local image indicated by the first selection instruction, and generate the target template according to the local image.

11. The apparatus according to claim 9, wherein the target template is a scalable vector graphics (SVG) file, and the processor is further configured to:
  parse the target template in accordance with an extensible markup language (XML) format to obtain path information of the target template and a color of each path in the path information; and
  display the target template image on the display interface according to the path information and the color of each path.

12. The apparatus according to claim 11, wherein the processor is further configured to:
  determine the drawing area on the display interface according to the path information, the drawing area being a closed area formed by at least one path.

13. The apparatus according to claim 8, wherein the processor is further configured to:
  acquire a second selection instruction according to the display interface; and
  determine a target paint indicated by the second selection instruction among multiple preset paints;
  wherein the processor is further configured to:
  draw, in accordance with the target paint, the image according to the operation position.

14. The apparatus according to claim 8, wherein the processor is further configured to:
  in response to determining that the operation position corresponding to the user input operation and the drawing area meet the preset condition, save the operation position and an execution time of the user input operation as an execution record; and
  send the execution record to a designated terminal device, so that the designated terminal device draws, in accordance with an order indicated by the execution time in the execution record, an image on a display interface of the designated terminal device according to the operation position in the execution record.

15. A non-transitory computer-readable medium, having a computer program stored thereon, wherein when the program is executed by a processing apparatus, the following operations are implemented:
- determining a drawing area corresponding to a target template image according to a display interface;
- acquiring a user input operation according to the display interface;
- in response to determining that an operation position corresponding to the user input operation and the drawing area meet a preset condition, drawing an image according to the operation position, wherein an area of the image is consistent with the drawing area corresponding to the target template image, and the drawing area corresponding to the target template image is an area where the target template image is located; and
- in response to determining that the operation position corresponding to the user input operation and the drawing area do not meet the preset condition, ignoring the user input operation;
- wherein the preset condition comprises:
- the operation position corresponding to the user input operation being located within the drawing area; or
- the operation position corresponding to the user input operation overlapping with an edge of the drawing area.

* * * * *